US012578666B2

(12) United States Patent
Ochi et al.

(10) Patent No.: US 12,578,666 B2
(45) Date of Patent: Mar. 17, 2026

(54) TONER AND METHOD FOR PRODUCING TONER

(71) Applicant: CANON KABUSHIKI KAISHA, Tokyo (JP)

(72) Inventors: Kouichirou Ochi, Chiba (JP); Masayuki Hama, Ibaraki (JP); Yuka Gunji, Ibaraki (JP); Hayato Ida, Ibaraki (JP); Kaoru Yoshida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 649 days.

(21) Appl. No.: 18/053,462

(22) Filed: Nov. 8, 2022

(65) Prior Publication Data

US 2023/0152725 A1 May 18, 2023

(30) Foreign Application Priority Data

Nov. 12, 2021 (JP) ................................ 2021-184947

(51) Int. Cl.

| | |
|---|---|
| ***G03G 9/097*** | (2006.01) |
| ***G03G 9/08*** | (2006.01) |
| ***G03G 9/087*** | (2006.01) |
| ***G03G 9/09*** | (2006.01) |

(52) U.S. Cl.

CPC ......... *G03G 9/09708* (2013.01); *G03G 9/081* (2013.01); *G03G 9/08755* (2013.01); *G03G 9/0906* (2013.01); *G03G 9/0918* (2013.01)

(58) Field of Classification Search

CPC ............. G03G 9/0906; G03G 9/08755; G03G 9/0918; G03G 9/09708

See application file for complete search history.

(56) References Cited

U.S. PATENT DOCUMENTS 6,430,384 B2 8/2002 Hama
7,135,263 B2 11/2006 Kawakami
8,921,023 B2 12/2014 Baba
8,927,188 B2 1/2015 Naka
9,057,970 B2 6/2015 Ida
9,348,247 B2 5/2016 Ida
9,348,253 B2 5/2016 Kanno
9,540,483 B2 1/2017 Ida
9,651,883 B2 5/2017 Hama
9,665,023 B2 5/2017 Kamae
9,696,644 B2 7/2017 Ida
9,897,934 B2 2/2018 Tamura
10,012,920 B2 7/2018 Shibata
10,036,970 B2 7/2018 Kanno
10,078,281 B2 9/2018 Ida
10,082,743 B2 9/2018 Hama
10,088,765 B2 10/2018 Miyakai
10,146,146 B2 12/2018 Komatsu
10,175,595 B2 1/2019 Onozaki
10,197,936 B2 2/2019 Onozaki
10,203,619 B2 2/2019 Yamashita
10,228,629 B2 3/2019 Tamura
10,274,851 B2 4/2019 Hashimoto
10,353,312 B2 7/2019 Kamae
10,401,748 B2 9/2019 Hashimoto
10,423,086 B2 9/2019 Hama
10,451,986 B2 10/2019 Sano
10,451,990 B2 10/2019 Kamae
10,474,049 B2 11/2019 Onozaki
10,514,624 B2 12/2019 Tamura
10,564,560 B2 2/2020 Onozaki
10,599,060 B2 3/2020 Kanno
10,656,545 B2 5/2020 Kamae
10,775,710 B1 9/2020 Kamae
10,859,931 B2 12/2020 Hashimoto
10,877,386 B2 12/2020 Murayama
10,969,705 B2 4/2021 Shirayama
11,029,617 B2 6/2021 Chimoto
11,112,711 B2 9/2021 Ochi
11,131,939 B2 9/2021 Hama
11,181,848 B2 11/2021 Ochi
11,385,558 B2 7/2022 Chimoto
2012/0231388 A1 9/2012 Kawamura
2013/0108955 A1 5/2013 Shibata
2014/0134535 A1 5/2014 Baba
2015/0099227 A1 4/2015 Ida
2016/0231661 A1* 8/2016 Nagai .................. G03G 9/0821
2017/0082933 A1* 3/2017 Dan .................. G03G 9/09783
2018/0314176 A1 11/2018 Ikeda
2020/0409284 A1 12/2020 Matsubara
2020/0409285 A1 12/2020 Tokunaga
2021/0080848 A1 3/2021 Tsuchida
2021/0141315 A1 5/2021 Kamae
2021/0181647 A1 6/2021 Hashimoto
2021/0181649 A1 6/2021 Kanno
2021/0181650 A1 6/2021 Hama
2021/0181651 A1 6/2021 Hashimoto
2021/0278774 A1 9/2021 Hashimoto
2021/0278775 A1 9/2021 Kamae
2022/0187728 A1 6/2022 Miura
2022/0197163 A1 6/2022 Kajihara
2022/0197166 A1 6/2022 Chimoto
2022/0197174 A1 6/2022 Kajihara
2022/0236654 A1 7/2022 Watanabe (Continued)

FOREIGN PATENT DOCUMENTS

JP 2005-99422 A 4/2005
JP 2012-67285 A 4/2012
JP 2016-114828 A 6/2016

OTHER PUBLICATIONS

U.S. Appl. No. 17/823,592, Ichiro Kanno, filed Aug. 31, 2022.

*Primary Examiner* — Peter L Vajda
*Assistant Examiner* — Jenna Kuipers
(74) *Attorney, Agent, or Firm* — VENABLE LLP

(57) ABSTRACT

A toner comprising a toner particle comprising an organic pigment and a binder resin, wherein, in a solid-state NMR measurement at 60° C. using a solid fraction obtained by specific procedure for dissolving the toner in chloroform as a sample, a transverse relaxation time T2 of a peak observed between 1.5 and 2.5 ppm is from 0.08 to 0.13 ms.

10 Claims, No Drawings

(56) References Cited

U.S. PATENT DOCUMENTS

| | | | |
|---|---|---|---|
| 2022/0236655 | A1 | 7/2022 | Kanno |
| 2022/0236656 | A1 | 7/2022 | Kanno |
| 2022/0299901 | A1 | 9/2022 | Murata |
| 2022/0299902 | A1 | 9/2022 | Abe |
| 2022/0326630 | A1 | 10/2022 | Hashimoto |
| 2022/0342335 | A1 | 10/2022 | Ochi |
| 2022/0404727 | A1 | 12/2022 | Ueda |
| 2022/0413406 | A1 | 12/2022 | Shino |

* cited by examiner

TONER AND METHOD FOR PRODUCING TONER

BACKGROUND OF THE INVENTION

Field of the Invention

The present disclosure relates to a toner used in an electrophotographic image forming method, and to a method for producing the toner.

Description of the Related Art

Electrophotographic full-color copiers, which have spread widely in recent years, are required to afford high speeds, high image quality and high productivity, all at a lower cost. A known approach (Japanese Patent Application Publication No. 2005-099422) aimed at achieving such high image quality involves finely dispersing a pigment in the toner, which results in higher image density in printed matter.

For the purpose of achieving reductions in cost, another known technique (Japanese Patent Application Publication No. 2016-114828) involves reducing the use amount of toner starting materials, by using an inexpensive filler. Blending a dispersant with a pigment, with a view to improving pigment dispersibility, is likewise a known technique (Japanese Patent Application Publication No. 2012-067285).

SUMMARY OF THE INVENTION

The toners disclosed in the above citations, however, have been found to still have room for improvement in terms of image density stability. The present disclosure provides a toner, and a method for producing toner, that afford excellent image density stability while preserving high image density.

The present disclosure relates to a toner comprising a toner particle comprising an organic pigment and a binder resin, wherein, in a solid-state NMR measurement at 60° C. using a solid fraction obtained in Procedure 1 below as a sample, a transverse relaxation time T2 of a peak observed between 1.5 and 2.5 ppm is from 0.08 to 0.13 ms.

Procedure 1:

a sucrose concentrate is prepared through addition of 160 g of sucrose to 100 mL of ion-exchanged water, and dissolution therein while under warming in hot water; a dispersion is produced by adding 31 g of the sucrose concentrate and 6 mL of a surfactant to a centrifuge tube; 2.0 g of toner are added to the dispersion, and toner clumps are broken using a spatula; the centrifuge tube is next shaken in a shaker; shaking is followed by precipitate removal through solution centrifugation, at 3500 rpm for 30 minutes at a rotation radius of 3 cm, to remove a precipitate; a floating solid fraction is filtered in a vacuum filter, and is thereafter dried in a dryer for 1 hour or longer, and 1 g of the obtained solid fraction is dissolved in 20 mL of chloroform, is centrifuged at 15000 rpm at a rotation radius of 3 cm for 180 minutes, and the supernatant is discarded; and further 20 mL of chloroform are added, the same operation is repeated twice, and a precipitated solid fraction is dried in a dryer for 5 hours or longer, to obtain the sample.

The present disclosure can provide the toner with excellent image density stability while preserving high image density.

Further features of the present invention will become apparent from the following description of exemplary embodiments.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

The present disclosure relates to a toner comprising a toner particle comprising an organic pigment and a binder resin, wherein, in a solid-state NMR measurement at 60° C. using a solid fraction obtained in Procedure 1 below as a sample, a transverse relaxation time T2 of a peak observed between 1.5 and 2.5 ppm is from 0.08 to 0.13 ms.

Procedure 1:

a sucrose concentrate is prepared through addition of 160 g of sucrose to 100 mL of ion-exchanged water, and dissolution therein while under warming in hot water; a dispersion is produced by adding 31 g of the sucrose concentrate and 6 mL of a surfactant to a centrifuge tube; 2.0 g of toner are added to the dispersion, and toner clumps are broken using a spatula; the centrifuge tube is next shaken in a shaker; shaking is followed by precipitate removal through solution centrifugation, at 3500 rpm for 30 minutes at a rotation radius of 3 cm, to remove a precipitate; a floating solid fraction is filtered in a vacuum filter, and is thereafter dried in a dryer for 1 hour or longer, and 1 g of the obtained solid fraction is dissolved in 20 mL of chloroform, is centrifuged at 15000 rpm at a rotation radius of 3 cm for 180 minutes, and the supernatant is discarded; and further 20 mL of chloroform are added, the same operation is repeated twice, and a precipitated solid fraction is dried in a dryer for 5 hours or longer, to obtain the sample.

The following is surmised concerning the underlying reasons why both image density and image stability can be achieved by the above toner.

As is known, visible light is efficiently absorbed if a colorant is finely dispersed in the interior of an image layer after fixing of toner, and an image of high density is obtained as a result. On the other hand, a finer colorant is also a more cohesive colorant; colorant aggregation portions into which the colorant becomes unevenly distributed form readily in the interior of and on the surface of the toner. When such colorant aggregation portions are exposed on the surface of the toner particle, the toner particle becomes readily charged positively through triboelectric charging within a carrier in a developer. The charging performance of the toner particle is impaired thereby, and as a result an increase in the number of prints gives rise to lower image density.

However, the inventors have found that the above toner delivers excellent image density stability while affording high image density. The underlying reasons for this are deemed to involve the following.

The organic pigment comprised in the toner and the resin component that is not soluble in chloroform, by virtue of being bound to the organic pigment, are obtained as samples in Procedure 1 above. The peaks observed between 1.5 to 2.5 ppm in a solid-state NMR measurement at 60° C. reflect the mobility of hydrogen atoms attributed to alkyl groups in the resin. It is therefore deemed that a high molecular weight resin, such as a gel, is bound to the organic pigment comprised in the toner that satisfies above transverse relaxation time T2.

As a result, the organic pigment becomes less readily charged through contact with a carrier; instead, the bound high molecular weight resin becomes charged through contact with a carrier. Those portions of the toner particle that detract from charging performance are reduced as a result, and in consequence the charge quantity of the toner is maintained, and drops in image density are less likely to occur, even when the number of prints is increased. In particular, it is deemed that the above action is singularly brought out and effects such as those above are elicited by virtue of the fact that a high molecular weight resin having molecular mobility such that the above transverse relaxation time T2 is from 0.08 to 0.13 ms is bound to the pigment surface.

Moreover, the toner satisfying the above T2 is in a state in which a polymer resin is bound to the surface of the organic pigment, thanks to which secondary aggregates of the pigment are less likely to be formed during production of the toner. The organic pigment is therefore finely dispersed in the toner, and high image density can be achieved.

The constituent components of the toner will be described below.

Organic Pigment

The toner particle comprises an organic pigment. The organic pigment preferably comprises at least one selected from the group consisting of magenta pigments, cyan pigments and yellow pigments. An organic pigment having an unsaturated bond (preferably a conjugated double bond) is preferred herein since such a pigment has a reaction point that facilitates binding of the resin to the surface of the pigment. Concrete examples of such pigments include the pigments below.

Examples of cyan pigments include the following. C. I. Pigment Blue 2, 3, 15:2, 15:3, 15:4, 16, 17; C. I. Vat Blue 6; Acid Blue 45; A copper phthalocyanine pigment having a phthalocyanine skeleton substituted with 1 to 5 phthalimidomethyl groups. Herein C. I. Pigment Blue 15:3 is preferred from the viewpoint of chromogenicity.

Examples of magenta toner pigments include the following. C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, 282; C. I. Pigment Violet 19; C. I. Vat Red 1, 2, 10, 13, 15, 23, 29, 35. Herein C. I. Pigment Red 122 is preferred from the viewpoint of chromogenicity.

Examples of yellow pigments include the following. C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, 185; C. I. Vat Yellow 1, 3, 20. Herein C. I. Pigment Yellow 180 is preferred from the viewpoint of chromogenicity.

The organic pigment is more preferably at least one selected from the group consisting of C. I. Pigment Blue 15:3, C. I. Pigment Red 122 and C. I. Pigment Yellow 180.

The organic pigment can be obtained from the toner particle in Procedure 1 below.

Procedure 1:

a sucrose concentrate is prepared through addition of 160 g of sucrose to 100 mL of ion-exchanged water, and dissolution therein while under warming in hot water; a dispersion is produced by adding 31 g of the sucrose concentrate and 6 mL of a surfactant to a centrifuge tube; 2.0 g of toner are added to the dispersion, and toner clumps are broken using a spatula; the centrifuge tube is next shaken in a shaker; shaking is followed by precipitate removal through solution centrifugation, at 3500 rpm for 30 minutes at a rotation radius of 3 cm, to remove a precipitate; a floating solid fraction is filtered in a vacuum filter, and is thereafter dried in a dryer for 1 hour or longer, and 1 g of the obtained solid fraction is dissolved in 20 mL of chloroform, is centrifuged at 15000 rpm at a rotation radius of 3 cm for 180 minutes, and the supernatant is discarded; and further 20 mL of chloroform are added, the same operation is repeated twice, and a precipitated solid fraction is dried in a dryer for 5 hours or longer, to obtain the sample.

Examples of surfactants include Contaminon N (by Wako Pure Chemical Industries, Ltd.). Contaminon N is a 10 mass % aqueous solution of a pH-7 neutral detergent for cleaning of precision measuring instruments, made up of a nonionic surfactant, an anionic surfactant and an organic builder.

The sample is shaken at 200 rpm for 1 minute, using YS-LD by Yayoi Co., Ltd. as a shaker.

Further, Front Lab FLD2012 (by AS ONE Corporation) is used as a centrifuge.

The polymer resin binds to the retrieved organic pigment. In a solid-state NMR measurement at 60° C. using the solid fraction obtained in Procedure 1 as a sample, the transverse relaxation time T2 of a peak observed between 1.5 and 2.5 ppm must be from 0.08 to 0.13 ms.

A peak observed between 1.5 and 2.5 ppm reflects the mobility of hydrogen atoms attributed to alkyl groups of the resin. The fact that a resin having alkyl groups of such short transverse relaxation time T2 is bound to the organic pigment suggests that a high molecular weight resin of low mobility, close to that of a gel, is bound to the organic pigment. A high molecular weight resin is therefore present, to a sufficient thickness, on the pigment surface, and as a result there is no contact between the pigment surface and the carrier, and fluctuations in toner particle charging are suppressed, during the electrophotographic process.

The method for obtaining a solid fraction having such a transverse relaxation time may be a method that involves kneading an organic pigment and a high molecular weight resin at high shear, to elicit binding of mechanoradicals generated in the resin to the surface of the organic pigment. The transverse relaxation time T2 of the obtained solid fraction can be controlled by adjusting the molecular weight of the resin. For instance the transverse relaxation time T2 tends to decrease when the molecular weight of the resin is increased.

The transverse relaxation time T2 is preferably from 0.09 to 0.12 ms, more preferably from 0.10 to 0.12 ms, and yet more preferably from 0.10 to 0.11 ms. Better image density and image density stability can be obtained within the above ranges.

The solid fraction obtained in Procedure 1 the content of the resin relative to 100 parts by mass of the organic pigment is preferably from 3.0 to 50.0 parts by mass. Within this range, the charging performance of the toner particle is preserved satisfactorily, and fluctuations in image density are unlikely to occur. When the resin content is 50 parts by mass or less, crosslinking between organic pigments can be suppressed, pigment dispersibility is improved, and image density is likewise improved.

The ratio of resin to pigment can be controlled for instance by modifying the molecular weight of the resin, or by modifying the number of kneading operations.

In the solid fraction obtained in Procedure 1, the content of resin relative to 100 parts by mass of the organic pigment is more preferably from 4.0 to 10.0 parts by mass, yet more preferably from 4.5 to 8.0 parts by mass, and still more preferably from 5.0 to 6.0 parts by mass. Better image density and image density stability are exhibited within the above ranges.

Herein DA denotes the number-average particle diameter of the organic pigment upon observation of the solid fraction obtained in Procedure 1 using a scanning electron microscope. Further, DB denotes the number-average particle diameter upon observation, using a dynamic light scattering type particle size distribution meter, of a dispersion obtained by stirring the solid fraction using a stirring apparatus and dispersing the solid fraction in water using an impact-type dispersing apparatus. Herein DA/DB is preferably 2.2 or higher. The mobility of the organic pigment in the solvent decreases within this range, which suggests that the resin is adsorbed on the organic pigment. Therefore, the charging performance of the toner particle is preserved more satisfactorily, and fluctuations in image density are unlikelier to occur.

Further, DA/DB is preferably 2.3 or higher. The upper limit of DA/DB is not particularly restricted, but is preferably 3.0 or lower, more preferably 2.6 or lower. Better image density and image density stability are exhibited within the above ranges. The value of DA/DB can be controlled for instance by modifying the molecular weight of the resin.

Binder Resin

The toner particle contains a binder resin. A known polymer can be used as the binder resin; specifically, for instance, the following polymers can be used.

Styrene and homopolymers of substitution products thereof such as polystyrene, poly-p-chlorostyrene, polyvinyl toluene, and the like; Styrene-based copolymers such as styrene-p-chlorostyrene copolymer, styrene-vinyl toluene copolymer, styrene-vinyl naphthalin copolymer, styrene-acrylic acid ester copolymers, styrene-methacrylic acid ester copolymers, styrene-α-methyl chloromethacrylate copolymers, styrene-acrylonitrile copolymers, styrene-vinyl methyl ether copolymers, styrene-vinyl ethyl ether copolymers, styrene-vinyl methyl ketone copolymers and styrene-acrylonitrile-indene copolymers; polyvinyl chloride, phenolic resins, natural resin-modified phenolic resins, natural resin-modified maleic acid resins, acrylic resins, methacrylic resins, polyvinyl acetate, silicone resins, polyester resins, polyurethane resins, polyamide resins, furan resins, epoxy resins, xylene resins, polyvinyl butyral, terpene resins, coumarone-indene resins, petroleum-based resins and the like. These resins may be used singly as one type, or concomitantly as two or more types thereof.

Preferred among the foregoing is a binder resin containing a polyester resin, from the viewpoint of the charging performance of the toner particle. The toner particle preferably comprises a polyester resin A and a polyester resin B. The polyester resin A and polyester resin B are preferably amorphous polyester resins.

The weight-average molecular weight of the polyester resin A is preferably from 3000 to 50000, more preferably from 5000 to 30000, and yet more preferably from 8000 to 15000.

The weight-average molecular weight of the polyester resin B is preferably from 500000 to 2300000, more preferably from 700000 to 2000000, and yet more preferably from 1000000 to 1500000.

Preferably, the polyester resin B is bound to the surface of the organic pigment, from the viewpoint of charging performance stability.

Preferably, the polyester resin A and the polyester resin B have the same monomer units. Charging performance stability is improved in such a case. The term monomer unit refers to a form resulting from reaction of a monomer substance in a polymer.

Preferably, the polyester resin is a condensation polymer of a polyhydric alcohol compound and a polyvalent carboxylic acid compound.

Examples of polyhydric alcohol compounds include alkylene oxide adducts of bisphenol A, such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane and polyoxypropylene(6)-2,2-bis(4-hydroxyphenyl)propane; as well as ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, and derivatives of the foregoing. The derivatives are not particularly limited so long as a similar resin structure can be obtained by condensation polymerization. Examples of the derivative include derivatives resulting from esterification of alcohol components.

The polyhydric alcohol compound that is used is preferably at least one selected from the group consisting of alkylene oxide adducts of bisphenol A. The proportion of the alkylene oxide adduct of bisphenol A in the polyhydric alcohol compound is preferably from 50 to 100 mol %, more preferably from 70 to 100 mol %, and yet more preferably from 90 to 100 mol %.

Examples of polyvalent carboxylic acid compounds include aromatic dicarboxylic acids and anhydrides thereof, such as phthalic acid, isophthalic acid and terephthalic acid; alkyldicarboxylic acids and anhydrides thereof, such as succinic acid, adipic acid, sebacic acid and azelaic acid; succinic acid substituted with a C6 to C18 alkyl group or alkenyl group, and anhydrides thereof, unsaturated dicarboxylic acids and anhydrides thereof, such as fumaric acid, maleic acid and citraconic acid; as well as derivatives of the foregoing. The derivatives are not particularly limited so long as a similar resin structure can be obtained by condensation polymerization. Examples include derivatives obtained through methyl esterification, ethyl esterification or acid chloridation of a carboxylic acid component.

Examples of trivalent or higher carboxylic acid components among polyvalent carboxylic acid compounds include trimellitic acid, trimellitic anhydride and pyromellitic acid.

Preferred as the polyvalent carboxylic acid compound are aromatic dicarboxylic acids, trimellitic acid or anhydrides thereof, more preferably terephthalic and trimellitic acid, or anhydrides thereof. The content ratio of aromatic dicarboxylic acid such as terephthalic acid in the polyvalent carboxylic acid compound is preferably from 60 to 95 mol %, more preferably from 70 to 90 mol %, and yet more preferably from 75 to 85 mol %. The content ratio of trimellitic acid or anhydride thereof in the polyvalent carboxylic acid compound is preferably from 5 to 35 mol %, more preferably from 10 to 30 mol % and yet more preferably from 15 to 25 mol %.

The polyester resin A and the polyester resin B preferably contain monomer units derived from an alkylene oxide adduct of bisphenol A, monomer units derived from terephthalic acid, and monomer units from trimellitic acid. That is, the polyester resin A and the polyester resin B are preferably condensation polymers of monomers comprising an alkylene oxide adduct of bisphenol A, terephthalic acid and trimellitic acid, or anhydrides thereof. Charging performance stability is improved in such a case. By comprising trimellitic acid, the resin is likelier to comprise a gel component, in which case the resin bonds readily with the pigment during kneading, as described further on.

The content ratio of the polyester resin A in the toner particle is preferably from 60 to 78 mass %, more preferably from 70 to 76 mass %. The content ratio of the polyester resin B in the toner particle is preferably from 1 to 10 mass %, more preferably from 2 to 5 mass %.

Preferably, the toner particle further comprises a crystalline polyester resin, in addition to the binder resin. Plasticization of the polyester resin bound to the surface of the organic pigment is facilitated herein by the crystalline polyester. As a result, organic pigment particles in the toner readily loosen up from one another during the production of the toner, and the dispersibility of the organic pigment increases, which facilitates further raising the density of the obtained image.

The content of the crystalline polyester in the toner particle is preferably from 1.0 to 10.0 mass %, more preferably from 2.0 to 7.0 mass %, and yet more preferably from 3.0 to 5.0 mass %. The above effects are readily brought out when the content is 1.0 mass % or higher. Aggregation of the pigment in the toner can be suppressed during fixing, and image density rises yet more readily, when the content is 10.0 mass % or lower.

Calcium Carbonate Particles

The toner particle preferably comprises calcium carbonate particles. The content ratio of the calcium carbonate particles in the toner particle is preferably from 3.0 to 15.0 mass %. In a case where the content ratio is 3.0 mass % or higher, the effect of pulverizing the pigment during kneading is enhanced, and chromogenicity improves yet more readily. In a case where the content ratio is 15.0 mass % or lower, chromogenicity can be further improved, while suppressing scattering of light by the calcium carbonate particles. The content of the calcium carbonate particles in the toner particle is more preferably from 3.5 to 14.0 mass %, and yet more preferably from 5.0 to 10.0 mass %.

In an X-ray diffraction measurement of the toner using CuKα rays, preferably, peaks are present in ranges of diffraction angle (2θ)=26.5°±0.1° and diffraction angle (2θ) =29.5°±0.1°. The crystallite size of calcium carbonate as calculated from a peak in the range of diffraction angle (2θ)=29.5°±0.1° is preferably from 10 to 45 nm. The value of the ratio (26.5° 0.10 peak intensity/29.5°±0.1° peak intensity) of peak intensity in the range of diffraction angle (2θ)=26.5°±0.1 relative to the peak intensity in the range of diffraction angle (2θ)=29.5°±0.1° is preferably from 0.15 to 0.24.

Higher chromogenicity can be realized by bringing about such a state of the calcium carbonate particles.

The crystallite size of the calcium carbonate particles as calculated from a peak in the range of diffraction angle (2θ)=29.5°±0.1 is more preferably from 20 to 45 nm, and yet more preferably from 25 to 40 nm. The crystallite size can be controlled by modifying the concentrations of calcium carbonate particles and of pigment in a below-described first kneading step. When the concentrations of the calcium carbonate particles and of the pigment are increased, the kneading conditions involve higher shear stress, and the crystallite size of the calcium carbonate particles becomes smaller.

The value of the ratio of the peak intensity in the range of diffraction angle (2θ)=26.5°±0.1° relative to the peak intensity in the range of diffraction angle (2θ)=29.5°±0.1° is more preferably from 0.16 to 0.23, and yet more preferably from 0.17 to 0.22. The value of the above ratio can also be controlled by modifying the concentrations of the calcium carbonate particles and of the pigment in the below-described first kneading step. When the concentrations of the calcium carbonate particles and of the organic pigment are increased, the kneading conditions involve a higher shear stress and a higher value of the above ratio.

Release Agent

A release agent that suppresses the occurrence of hot offset during heat fixing of the toner may be used, as the case may require. Ordinary examples of the release agent include low molecular weight polyolefins, silicone waxes, fatty acid amides, ester waxes, carnauba wax and hydrocarbon waxes.

External Additive

An external additive may be added to the toner particle, as needed. Examples of external additives include inorganic particles such as silica, alumina, titania and calcium carbonate, and resin particles such as vinyl resins, polyester resins and silicone resins.

Strontium titanate particles are preferably used herein as the external additive. That is, the toner preferably comprises a toner particle and an external additive, and the external additive comprises strontium titanate particles. Through the use of an external additive in the form of particles exhibiting a high dielectric constant and low resistance, such as strontium titanate particles, excessive charge on the binder resin such as a polyester resin bound to the organic pigment is eliminated during the toner charging and developing process. Initial charging is curtailed thereby and, as a result, image density stability is further improved.

The content of the strontium titanate particles in the toner is preferably from 0.1 to 1.0 part by mass, and more preferably from 0.1 to 0.9 parts by mass, relative to 100 parts by mass of the toner particle. When the content is 0.1 parts by mass or higher, the effect of charging performance stability is brought out yet more readily. When the content is 1.0 part by mass or lower, charge leakage can be suppressed, and image density stability improves yet more readily.

Toner Production Method

The method for producing the toner is not particularly limited, and known methods such as emulsification aggregation, kneading pulverization or suspension polymerization can be resorted to. Kneading pulverization is preferred herein. A kneading pulverization method will be described next.

Firstly, materials constituting the toner particle, for instance a binder resin and an organic pigment, and, as needed, other components such as calcium carbonate particles and a release agent, are weighed in predetermined amounts, and are blended and mixed. Examples of the mixing device include a double-cone mixer, a V-type mixer, a drum-type mixer, a Super mixer, Henschel mixer, a Nauta mixer, MechanoHybrid (manufactured by Nippon Coke & Engineering, Ltd.), and the like.

Next, the mixed materials are melt-kneaded. In the melt-kneading step, a batch-type kneader such as a pressure kneader or a Banbury mixer, or a continuous kneader can be used. Single-screw or twin-screw extruders are preferably used because of their superiority in continuous production. The melt-kneading temperature is preferably from about 100 to 200° C.

The toner production method preferably has a first kneading step of obtaining a pigment mixture by melt-kneading part of a binder resin (preferably part of a polyester resin A, and polyester resin B), and an organic pigment (preferably, further calcium carbonate particles), and a second kneading step of melt-kneading the pigment mixture and the remaining binder resin (preferably, the remaining of the polyester resin A), to yield a resin composition.

Preferably, in the first kneading step the content ratio of the total of the polyester resin A and the polyester resin B in the pigment mixture is from 20 to 50 mass %, and the content ratio of the organic pigment in the pigment mixture is from 20 to 60 mass %. Preferably, in the second kneading step content ratio of the total of polyester resin A and polyester resin B in the resin composition is from 50 to 80 mass %, and the content ratio of the organic pigment in the resin composition is from 3 to 20 mass %.

In the first kneading step, the polyester resin B and the organic pigment are kneaded at a high shear stress since the proportion of the solid fraction that does not melt is high, during kneading of the organic pigment and of for instance the calcium carbonate particles that are added as needed. It is deemed that under such conditions the molecular chains of the polyester resin B are broken and mechanoradicals generated, through kneading, so that the polyester resin B becomes bound to the surface of the organic pigment as a result. The organic pigment thus produced, having the polyester resin B bound to the surface thereof, exhibits excellent charging performance stability.

The higher the molecular weight of the polyester resin B, the greater the amount of mechanoradicals that are generated, which in turn promotes binding to the pigment. When the molecular weight is low, mechanoradicals are generated less readily by kneading, and thus binding to the pigment is less likely to occur.

In the first kneading step the content ratio of the polyester resin A and polyester resin B in the pigment mixture is more preferably from 25 to 40 mass %, and yet more preferably from 28 to 35 mass %. The content ratio of the polyester resin B in the pigment mixture is preferably from 5 to 30 mass %, more preferably from 10 to 20 mass %, and yet more preferably from 13 to 17 mass %. The content ratio of the organic pigment in the pigment mixture is more preferably from 25 to 40 mass %. The content ratio of the calcium carbonate particles in the pigment mixture is preferably from 10 to 50 mass %, more preferably from 30 to 45 mass %.

In the second kneading step the content ratio of the total of the polyester resin A and the polyester resin B in the resin composition is more preferably from 70 to 80 mass %. The content ratio of the organic pigment in the resin composition is more preferably from 4 to 10 mass %.

The content ratio of the polyester resin A in the resin composition is preferably from 60 to 78 mass %, more preferably from 70 to 76 mass %. The content ratio of the polyester resin B in the resin composition is preferably from 1 to 10 mass %, and more preferably from 2 to 5 mass %. The content ratio of the calcium carbonate particles in the resin composition is preferably from 3 to 15 mass %, and more preferably from 5 to 10 mass %.

Examples of the mixing device include a KTK type twin-screw extruder (manufactured by Kobe Steel, Ltd.), a TEM type twin-screw extruder (manufactured by Toshiba Machine Co., Ltd.), a PCM kneader (manufactured by Ikegai Corp.), a twin-screw extruder (manufactured by KCK Engineering Co.), a co-kneader (manufactured by Buss AG), Kneadex (manufactured by Nippon Coke & Engineering Co., Ltd.), and the like. Further, the kneaded product obtained by melt-kneading is to be rolled with two rolls or the like and cooled with water or the like in a cooling step.

Then, the cooled product of the kneaded product can be pulverized to a desired particle diameter in the pulverization step. In the pulverization step, after coarse pulverization with a pulverizer such as a crusher, a hammer mill, or a feather mill, fine pulverization is further performed, for example, with Cryptron System (manufactured by Kawasaki Heavy Industries, Ltd.), Super Rotor (manufactured by Nisshin Engineering Co., Ltd.), a turbo mill (manufactured by Freund-Turbo Corporation), or a fine pulverizer based on an air jet method, and obtain the toner particle.

After that, if necessary, classification may be performed with a classifier or a sieving machine such as Elbow Jet of an inertial classification system (manufactured by Nittetsu Mining Co., Ltd.), Turboplex of a centrifugal force classification system (manufactured by Hosokawa Micron Corporation), a TSP separator (manufactured by Hosokawa Micron Corporation), and Faculty (manufactured by Hosokawa Micron Corporation) to obtain toner particles.

The weight-average particle diameter of the toner particle is preferably from 4 to 12 μm, and more preferably from 5 to 8 μm. The toner particle produced as a result of the above steps may be used, as-is, as the toner. Inorganic fine particles such as silica, alumina, titania calcium carbonate or the like, or resin fine particles of a vinyl resin, polyester resin, silicone resin or the like may be added as needed to the toner particle, in a dry state, with application of shear forces. These inorganic fine particles and resin fine particles function as external additives, for instance as flowability aids and cleaning aids. The content ratio of the external additive is preferably from 1.0 to 10.0 parts by mass, and more preferably from 2.0 to 5.0 parts by mass, relative to 100 parts by mass of the toner particle.

The toner can be used as a one-component developer, and may be used as a two-component developer by being mixed with a magnetic carrier. Generally known magnetic carriers can be used as the magnetic carrier, for instance magnetic bodies such as surface-oxidized iron powder or unoxidized iron powder, particles of metals such as iron, lithium, calcium, magnesium, nickel, copper, zinc, cobalt, manganese or rare earths, alloy particles and oxide particles of the foregoing, and ferrite, as well as magnetic body-dispersed resin carriers (so-called resin carriers) that contain a magnetic body and a binder resin that holds therein the magnetic body in a dispersed state.

Concerning the carrier mixing ratio in a case where the toner is used as a two-component developer by being mixed with a magnetic carrier, good results are ordinarily obtained by setting the toner concentration in the two-component developer to range preferably from 2 to 15 mass %, and more preferably from 4 to 13 mass %.

Methods for measuring various physical properties are described next.

Measurement of Transverse Relaxation Time T2

The transverse relaxation time T2 is measured, by solid-state NMR, as follows.

A sample of the solid fraction obtained in Procedure 1 described above is placed in a sample cell, and the sample is measured under the following conditions.

Device: JNM-ECA400-II by JEOL Ltd.

Probe: 4 mm MAS probe

Sample revolutions: 10 kHz

Measurement temperature: 60° C.

Measured nucleus: $^{1}H$ (proton)

Measurement range: 5±125 (ppm)

Pulse mode: spin echo mode 90-degree pulse width: 3.121 μsec 180-degree pulse width: 6.242 μsec Total echo time: 30 points at 0.3 μs, 0.45 μs, 0.69 μs, 1.04 μs, 1.58 μs, 2.38 μs, 3.61 μs, 5.46 μs, 8.27 μs, 12.52 μs, 18.96 μs, 28.7 μs, 43.44 μs, 65.76 μs, 99.54 μs, 150.69 μs, 228.11 μs, 345.31 μs, 522.72 μs, 791.28 μs, 1.19783 ms, 1.81326 ms, 2.74488 ms, 4.15516 ms, 6.29 ms, 9.5217 ms, 14.4138 ms, 21.819 ms, 33.03 ms and 50 ms.

Repetition interval: 5 sec

Number of repetitions: 8 repeats

Number of data points: 1024

The obtained results are subjected to regression analysis calculation using the analysis software "Delta" by JEOL Ltd. A peak between 1.0 ppm and 2.5 ppm is selected as the peak to be analyzed, and the obtained relaxation curve is fitted to $f(t)=f(0)\exp(-t/T2)$ in the analysis mode "Unweighted Linear Spin Lock mode", to work out the transverse relaxation time T2 (ms).

Mass Ratio of Resin to Pigment in the Solid Fraction Obtained in Procedure 1

The solid fraction separated from the toner in Procedure 1 is measured using a thermogravimetric/differential thermal analyzer (by Rigaku Corporation, differential thermal balance TG-DTA, ThermoPlus TG8120). The temperature is raised from 25° C. to 400° C. at a rate of 10° C./min, and the adsorption amount of resin is measured on the basis of the change in weight.

Number-Average Particle Diameter DA of the Organic Pigment Using a Scanning Electron Microscope (SEM)

The solid fraction obtained in Procedure 1 above is observed under a scanning electron microscope (S-4800, by Hitachi High-Technologies Corporation). The number-average particle diameter DA is calculated by measuring the length of 100 particles of the organic pigment, and working out the arithmetic mean value of the results.

Number-Average Particle Diameter DB in an Observation Using a Dynamic Light Scattering-Type Particle Size Distribution Meter Herein 5 mass % of dodecylbenzenesulfonic acid are added to the solid fraction separated from the toner particle in Procedure 1, and 3000 parts by mass of ion-exchanged water are further added to 100 parts by mass of the solid fraction, with stirring using an ultra-high speed stirring apparatus T. K. Robomix (by Primix Corporation) at 7000 rpm. The dispersion after stirring is further dispersed at a pressure of 200 MPa using a high-pressure impact-type dispersing apparatus Nanomizer (by Yoshida Kikai Co., Ltd.). Thereafter, the resulting dispersion is measured using a dynamic light scattering type particle size distribution meter Nanotrac UPA-EX150, to work out the number-average particle diameter DB. Specifically, the operating conditions include a measurement time of 30 seconds, a sample particle refractive index of 1.50, water as the dispersion medium, and a dispersion medium refractive index of 1.33. The volume particle size distribution of the measurement sample is measured, and the number-average particle diameter is calculated on the basis of the result of the measurement.

Identification of Resin Monomer Units

Structures are analyzed using a pyrolysis-gas chromatography-mass spectrometer (GC/MS), as follows. Herein 300 μg of toner, resin separated from toner, or the solid fraction obtained in Procedure 1, is embedded in Pyrofoil F590 below, and the whole is introduced in a pyrolysis furnace, with heating at 590° C. for 5 seconds in an inert (helium) atmosphere; the decomposition gas generated as a result is thereupon introduced through the injection port of a gas chromatograph, and the oven profile below is then carried out. The column outlet is connected to an MS analyzer via a transfer line, and a total ion chromatogram (TIC) is achieved in which ion current is plotted on the vertical axis and retention time is plotted on the horizontal axis. A mass spectrum is extracted next for all peaks detected in the obtained chromatogram, using ancillary software, and compounds are attributed on the basis of the NIST-2017 database.

The measuring device and measuring conditions are as follows.

Pyrolysis furnace: Nippon Analytical Industry JSP900 (by Japan Analytical Industry Co., Ltd.)

Pyrofoil: F590 (by Nippon Analytical Industry Co., Ltd.)

GC: Agilent Technologies Inc. 7890A GC

MS: Agilent Technologies Inc. 5975C

Column: HP-5 ms 30 m, inner diameter 0.25 mm, mobile phase thickness 0.25 μm (by Agilent Technologies Inc.)

Carrier gas: He (purity of 99.9995% or higher)

Oven profile: (1) temperature held at 40° C. for 3 minutes, (2) warming up to 320° C. at 10° C./min, (3) temperature held at 320° C. for 20 minutes Inlet temperature: 280° C.

Split ratio: 50:1

Column flow rate: 1 mL/min (quantitative)

Transfer line temperature: 280° C.

Observation MS range: 30-600 Da

Ionization: EI 70 eV

Ion source temperature: 280° C.

Quadrupole temperature: 150° C.

Measurement of the Content of Calcium Carbonate Particles

A sucrose concentrate is prepared through addition of 160 g of sucrose to 100 mL of ion-exchanged water, and dissolution therein while under warming in hot water; a dispersion is produced by adding 31 g of the sucrose concentrate and 6 mL of a surfactant to a centrifuge tube; 2.0 g of toner are added to the dispersion, and toner clumps are broken using a spatula; the centrifuge tube is next shaken in a shaker; shaking is followed by precipitate removal through solution centrifugation, at 3500 rpm for 30 minutes at a rotation radius of 3 cm, to remove a precipitate; a floating solid fraction is filtered in a vacuum filter, and is thereafter dried in a dryer for 1 hour or longer, and 1 g of the obtained solid fraction is dissolved in 20 mL of chloroform, is centrifuged at 15000 rpm at a rotation radius of 3 cm for 180 minutes, and the supernatant is discarded; and further 20 mL of chloroform are added, the same operation is repeated twice, and a precipitated solid fraction is dried in a dryer for 5 hours or longer, to obtain the sample The content of calcium carbonate particles in the solid fraction thus obtained is measured using a wavelength-dispersive X-ray fluorescence analyzer "Axios" (by PANalytical B. V.).

Measurement of X-Ray Diffractometry Peaks of Calcium Carbonate Particles

The calcium carbonate particles in the toner are measured using a measurement device "RINT-TTRII" (by Rigaku Corporation), with the diffraction angle ($2\theta \pm 0.20$ deg) in the range from 3 to 35 deg for CuKα characteristic X-rays. From the total integrated intensity of the obtained spectrum there are worked out the crystallite size of crystals attributed to the diffraction angle $(2\theta)=29.5° \pm 0.5°$, and a value of the ratio of the peak intensity of crystals attributed diffraction angle $(2\theta)=26.5° \pm 0.5°$ relative to the peak intensity of crystals attributed to the diffraction angle $(2\theta)=29.5° \pm 0.5°$. Toner is used as the sample. In a case where the effect of an external additive needs to be nullified, the external additive can be removed by performing the above operation up to centrifugation at 3500 rpm in Procedure 1 above. Therefore, the toner particle obtained by removing the external additive as a result of the above operation may be used as the sample. The measurement conditions are as follows.

X-ray: Cu/50 kV/300 mA

Goniometer: rotor horizontal goniometer (TTR-2)

Attachment: standard sample holder

Divergence slit: disengaged

Divergence longitudinal limiting slit: 10.00 mm

Scattering slit: open

Receiving slit: open

Counter: scintillation counter

Scan mode: continuous

Scan speed: 4.0000°/min.

Sampling width: 0.0200°

Scan axis: $2\theta/\theta$

Scanning range: 10.0000-40.0000°

Measurement of the Weight-Average Molecular Weight of Polyester Resin a and Polyester Resin B The weight-average molecular weights of polyester resin A and polyester resin B are measured by gel permeation chromatography (GPC), as follows.

Firstly, a measurement target (polyester resin A, polyester resin B or toner) is dissolved in tetrahydrofuran (THF) at room temperature over 24 hours. The obtained solution is then filtered through a solvent-resistant membrane filter "MYSYORI DISC" (by Tosoh Corporation) having a pore diameter of 0.2 μm, to yield a sample solution. The sample solution is adjusted so that the concentration of the THF-soluble component is about 0.8 mass %. This sample solution is used for measurement, under the conditions below.

Apparatus: HLC8120 GPC (detector: RI) (by Tosoh Corporation)

Column: 7 columns Shodex KF-801, 802, 803, 804, 805, 806, 807 (by Showa Denko)

Eluent: tetrahydrofuran (THF)

Flow rate: 1.0 mL/min

Oven temperature: 40.0° C.

Sample injection amount: 0.10 mL

To calculate the molecular weight of the sample there is used a molecular weight calibration curve created using a standard polystyrene resin (product name "TSK STANDARD POLYSTYRENE F-850, F-450, F-288, F-128, F-80, F-40, F-20, F-10, F-4, F-2, F-1, A-5000, A-2500, A-1000, A-500", by Tosoh Corporation).

In a case where toner is used as the sample, each peak is further separated from the obtained molecular weight distribution curve, to calculate the weight-average molecular weight of each polyester resin.

Measurement of the Content of Crystalline Polyester Resin in the Toner Particle

As described below, the content of a crystalline polyester resin can be worked out through separation of the crystalline polyester resin from the toner by exploiting differences in solubility in solvents.

First separation: the toner is dissolved in methyl ethyl ketone (MEK) at 23° C., to separate a soluble fraction (binder resin) and an insoluble fraction (crystalline polyester resin, release agent, organic pigment, inorganic fine particles and so forth).

Second separation: the insoluble fraction (crystalline polyester resin, release agent, organic pigment, inorganic fine particles and so forth) obtained in the first separation is dissolved in MEK at 100° C., and the resulting soluble fraction (crystalline polyester resin and release agent) and insoluble fraction (organic pigment, inorganic fine particles and so forth) are separated.

Third separation: the soluble fraction (crystalline polyester resin and release agent) obtained in the second separation is dissolved in chloroform at 23° C., whereupon the crystalline polyester resin is separated as a soluble fraction. The content of the crystalline polyester resin can then be worked out by measuring the mass thereof after sufficient removal of the solvent by drying.

Measurement of the Content of Strontium Titanate in the Toner

The content of strontium titanate in the toner is measured by X-ray fluorescence. The measurement method conforms to JIS K 0119-1969, and is specifically as follows.

The measurement device utilized herein is a wavelength-dispersive X-ray fluorescence analyzer "Axios" (by PANalytical B. V.), with dedicated software "SuperQ ver. 4.0F" (by PANalytical B. V.) for setting measurement conditions and analyzing measurement data. Rhodium (Rh) is used as the anode of the X-ray tube, the measurement atmosphere is vacuum, the measurement diameter (collimator mask diameter) is set to 27 mm, and the measurement time is set to 10 seconds. Detection is carried out using a proportional counter (PC) to measure light elements, and using a scintillation counter (SC) to measure heavy elements.

Herein 4 g of toner are placed in a dedicated aluminum ring for pressing, are smoothed over and are pressed at 20 MPa for 60 seconds using the below-described tablet press, to obtain a molded pellet having a thickness of about 2 mm and a diameter of about 39 mm, that is used as the measurement sample.

Tablet press "BRE-32" (by Maekawa Testing Machine Mfg. Co., Ltd.).

The measurement is performed under the above conditions, and elements derived from strontium titanate are identified on the basis of the obtained X-ray peak positions; the content of strontium titanate is calculated thereupon from a count rate (units: cps) which is the number of X-ray photons per unit time.

EXAMPLES

Hereinafter, the present invention will be described in more detail by way of Examples. The present invention is not limited by the following Examples. "Part" in the formulation in the text is based on mass unless otherwise specified.

Production of Cyan Pigment Masterbatch CM1

Cyan pigment (PB15:3): 30 parts

Calcium carbonate 1 (number-average particle diameter 400 nm): 40 parts

Polyester resin A1: 15 parts

Polyester resin B1: 15 parts (The monomer composition, molar ratio and weight-average molecular weight of polyester resin A1 and of polyester resin B1 are given in Table 1.)

The above materials were mixed using a Henschel mixer (FM-75 model, by Nippon Coke & Engineering Co., Ltd.) at revolutions of 20 $s^{-1}$ and for a rotation time of 5 min, followed by kneading in a twin-screw kneader (PCM-30 model, by Ikegai Corporation) at 200 rpm and 120° C.

The obtained kneaded product was cooled and coarsely pulverized in a pin mill down to a volume-average particle diameter of 100 μm or less, to yield a coarsely pulverized product of Cyan pigment masterbatch CM1.

formed once in CM1 to CM9 and CM12 to CM14. The first kneading step was performed twice in CM10. The first kneading step was performed thrice in CM11.

Production of Cyan Pigment Masterbatch CM10

A powder was produced in the same way as in Cyan pigment masterbatch CM1, but modifying the materials to those given in Table 2, and the obtained powder was further kneaded in a twin-screw kneader (PCM-30 model, by Ikegai Corporation) at 200 rpm and 120° C. The obtained kneaded product was cooled and coarsely pulverized in a pin mill down to a volume-average particle diameter of 100 μm or less, to yield a coarsely pulverized product of Cyan pigment masterbatch CM10.

TABLE 1

| Resin No. | Type and molar ratio of acid component | | | Type and molar ratio of alcohol component | Weight-average molecular weight |
|---|---|---|---|---|---|
| Polyester resin A1 | Terephthalic acid 80 | Trimellitic acid 20 | | Propylene oxide 3-mole adduct of bisphenol A 100 | 10000 |
| Polyester resin A2 | Fumaric acid 50 | Adipic acid 50 | Trimellitic acid 20 | Hexanediol 100 | 12000 |
| Polyester resin A3 | Fumaric acid 50 | Adipic acid 50 | | Hexanediol 100 | 13000 |
| Polyester resin B1 | Terephtalic acid 80 | Trimellitic acid 20 | | Propylene oxide 3-mole adduct of bisphenol A 100 | 1200000 |
| Polyester resin B2 | Fumaric acid 50 | Adipic acid 50 | Trimellitic acid 20 | Hexanediol 100 | 1300000 |
| Polyester resin B3 | Fumaric acid 50 | Adipic acid 50 | | Hexanediol 100 | 1600000 |
| Polyester resin B4 | Terephtalic acid 90 | Trimellitic acid 10 | | Propylene oxide 3-mole adduct of bisphenol A 100 | 800000 |
| Polyester resin B5 | Terephtalic acid 75 | Trimellitic acid 25 | | Propylene oxide 3-mole adduct of bisphenol A 100 | 2500000 |
| Polyester resin B6 | Terephtalic acid 92 | Trimellitic acid 8 | | Propylene oxide 3-mole adduct of bisphenol A 100 | 400000 |

Production of Cyan Pigment Masterbatches CM2 to CM9

Cyan pigment masterbatches CM2 to CM9 were obtained in the same way as in Cyan pigment masterbatch CM1, but modifying materials to those given in Table 2.

Production of Cyan Pigment Masterbatch CM11

A powder was produced in the same way as in Cyan pigment masterbatch CM8, but modifying the materials to those given in Table 2, and the obtained powder was further kneaded in a twin-screw kneader (PCM-30 model, by Ikegai Corporation) at 200 rpm and 120° C. The obtained kneaded product was cooled and coarsely pulverized in a pin mill

TABLE 2

| Masterbatch No. | Polyester resin A | Blending amount (parts) | Polyester resin B | Blending amount (parts) | Total amount of resin (parts) | Calcium carbonate | Blending amount (parts) | Pigment | Blending amount (parts) | Amount of pigment/ polyester resin |
|---|---|---|---|---|---|---|---|---|---|---|
| CM1 | A1 | 15 | B1 | 15 | 30 | Calcium carbonate 1 | 40 | PB15:3 | 30 | 100 |
| CM2 | A1 | 18 | B1 | 18 | 35 | Calcium carbonate 1 | 45 | PB15:3 | 20 | 57 |
| CM3 | A1 | 25 | B1 | 25 | 50 | Calcium carbonate 1 | 20 | PB15:3 | 30 | 60 |
| CM4 | A1 | 13 | B1 | 13 | 26 | Calcium carbonate 1 | 54 | PB15:3 | 20 | 77 |
| CM5 | A1 | 28 | B1 | 28 | 56 | Calcium carbonate 1 | 14 | PB15:3 | 30 | 54 |
| CM6 | A1 | 15 | B1 | 35 | 50 | — | 0 | PB15:3 | 50 | 100 |
| CM7 | A2 | 15 | B2 | 15 | 30 | Calcium carbonate 1 | 40 | PB15:3 | 30 | 100 |
| CM8 | A3 | 15 | B2 | 15 | 30 | Calcium carbonate 1 | 40 | PB15:3 | 30 | 100 |
| CM9 | A3 | 15 | B3 | 15 | 30 | Calcium carbonate 1 | 40 | PB15:3 | 30 | 100 |
| CM10 | A1 | 15 | B1 | 15 | 30 | Calcium carbonate 1 | 40 | PB15:3 | 30 | 100 |
| CM11 | A1 | 15 | B1 | 15 | 30 | Calcium carbonate 1 | 40 | PB15:3 | 30 | 100 |
| CM12 | A1 | 15 | B4 | 15 | 30 | Calcium carbonate 1 | 40 | PB15:3 | 30 | 100 |
| CM13 | A1 | 15 | B5 | 15 | 30 | Calcium carbonate 1 | 40 | PB15:3 | 30 | 100 |
| CM14 | A1 | 15 | B6 | 15 | 30 | Calcium carbonate 1 | 40 | PB15:3 | 30 | 100 |

In the table, the "Amount of pigment/polyester resin" denotes parts by mass of pigment relative to 100 parts by mass of polyester resin. The first kneading step was per-kneaded in a twin-screw kneader (PCM-30 model, by Ikegai Corporation) at 200 rpm and 120° C. The obtained kneaded product was cooled and coarsely pulverized in a pin mill down to a volume-average particle diameter of 100 μm or less, to yield a coarsely pulverized product of Cyan pigment masterbatch CM11.

Production of Cyan Pigment Masterbatches CM12 to CM14

Cyan pigment masterbatches CM12 to CM14 were obtained in the same way as in Cyan pigment masterbatch CM1, but modifying materials to those given in Table 2.

Production of Cyan Toner CT1

Polyester resin A1: 72 parts

Pigment masterbatch CM1: 20 parts

Synthetic wax 1: 8 parts (hydrocarbon wax, peak temperature of maximum endothermic peak: 90° C.)

The above materials were mixed using a Henschel mixer (FM-75 model, by Nippon Coke & Engineering Co., Ltd.) at revolutions of 20 $s^{-1}$ and for a rotation time of 5 min, followed by kneading at a set temperature of 130° C. in a twin-screw kneader (PCM-30 model, by Ikegai Corporation). The obtained kneaded product was cooled and coarsely pulverized in a pin mill down to a volume-average particle diameter of 100 m or less, to yield a coarsely pulverized product. The obtained coarsely pulverized product was finely pulverized using a mechanical pulverizer (T-250, by Turbo Kogyo Co., Ltd.), with the revolutions and number of passes adjusted so as to obtain the target particle diameter. The resulting product was classified using a rotary classifier (200TSP, by Hosokawa Micron Corporation), to yield a toner particle.

The operating conditions of the rotary classifier (200TSP, by Hosokawa Micron Corporation) involved classification by adjusting the revolutions so that the targeted particle diameter and particle size distribution were obtained. Then 1.8 parts of fine silica particles having a specific surface area of 200 $m^2/g$, as measured in accordance with the BET method and having been hydrophobized with silicone oil, were added to 100 parts of the obtained toner particle, and the whole was mixed using a Henschel mixer (FM-75 model, by Nippon Coke & Engineering Co., Ltd.), at revolutions of 30 $s^{-1}$ and for a rotation time of 10 min, to yield Cyan toner CT1.

Production Examples of Cyan Toners CT2 to CT5

Cyan toners CT2 to CT5 were obtained in the same way as in Cyan toner CT1, but modifying materials to those given in Table 3-1. Crystalline polyester resin C1 below was used herein.

(Crystalline polyester resin C1: composition (mol %) [1,6-hexanediol:dodecanedioic acid=100:100], melting point=72° C.)

Production Example of Cyan Toner CT6

A toner particle was produced in the same way as in Cyan toner CT1, but modifying the materials to the materials given in Table 3-1; to 100 parts of the obtained toner particle there were added 1.8 parts of silica fine particles having been hydrophobized with silicone oil and having a specific surface area of 200 $m^2/g$ as measured in accordance with the BET method, and further 0.1 parts of strontium titanate having a specific surface area of 50 $m^2/g$ as measured in accordance with the BET method, and the whole was mixed using a Henschel mixer (FM-75 model, by Nippon Coke & Engineering Co., Ltd.), at revolutions of 30 $s^{-1}$ and for a rotation time of 10 min, to yield Cyan toner CT6.

Production Example of Cyan Toner CT7

Cyan toner CT7 was obtained in the same way as in Cyan toner CT6, but modifying the materials to those given in Table 3-1, and modifying the amount of strontium titanate to 0.9 parts.

Production Example of Cyan Toner CT8

Cyan toner CT8 was obtained in the same way as in Cyan toner CT6, but modifying the materials to those given in Table 3-1, and modifying the amount of strontium titanate to 1.2 parts.

Production Example of Cyan Toner CT9 to CT21

Cyan toner CT9 to CT21 were obtained in the same way as in Cyan toner CT1, but modifying materials to those given in Table 3-1. Table 3-2 shows the physical characteristics of the Cyan toner.

TABLE 3-1

| | Polyester resin | | Crystalline Polyester resin | | Cyan masterbatch | | Wax | |
|---|---|---|---|---|---|---|---|---|
| Toner No. | Lot | Blending amount (parts) | Lot | Blending amount (parts) | Lot | Blending amount (parts) | Lot | Blending amount (parts) |
| CT1 | A1 | 72 | — | — | CM1 | 20 | Synthetic wax 1 | 8 |
| CT2 | A1 | 68.0 | C1 | 4.0 | CM1 | 20 | Synthetic wax 1 | 8 |
| CT3 | A1 | 70.8 | C1 | 1.2 | CM1 | 20 | Synthetic wax 1 | 8 |
| CT4 | A1 | 62.5 | C1 | 9.5 | CM1 | 20 | Synthetic wax 1 | 8 |
| CT5 | A1 | 61.5 | C1 | 10.5 | CM1 | 20 | Synthetic wax 1 | 8 |
| CT6 | A1 | 72 | — | — | CM1 | 20 | Synthetic wax 1 | 8 |
| CT7 | A1 | 72 | — | — | CM1 | 20 | Synthetic wax 1 | 8 |
| CT8 | A1 | 72 | — | — | CM1 | 20 | Synthetic wax 1 | 8 |
| CT9 | A1 | 62 | — | — | CM2 | 30 | Synthetic wax 1 | 8 |
| CT10 | A1 | 72 | — | — | CM3 | 20 | Synthetic wax 1 | 8 |
| CT11 | A1 | 62 | — | — | CM4 | 30 | Synthetic wax 1 | 8 |
| CT12 | A1 | 72 | — | — | CM5 | 20 | Synthetic wax 1 | 8 |
| CT13 | A1 | 80 | — | — | CM6 | 12 | Synthetic wax 1 | 8 |
| CT14 | A2 | 72 | — | — | CM7 | 20 | Synthetic wax 1 | 8 |
| CT15 | A3 | 72 | — | — | CM8 | 20 | Synthetic wax 1 | 8 |
| CT16 | A3 | 72 | — | — | CM9 | 20 | Synthetic wax 1 | 8 |
| CT17 | A1 | 72 | — | — | CM10 | 20 | Synthetic wax 1 | 8 |
| CT18 | A1 | 72 | — | — | CM11 | 20 | Synthetic wax 1 | 8 |

TABLE 3-1-continued

| | Polyester resin | | Crystalline Polyester resin | | Cyan masterbatch | | Wax | |
|---|---|---|---|---|---|---|---|---|
| Toner No. | Lot | Blending amount (parts) | Lot | Blending amount (parts) | Lot | Blending amount (parts) | Lot | Blending amount (parts) |
| CT19 | A1 | 72 | — | — | CM12 | 20 | Synthetic wax 1 | 8 |
| CT20 | A1 | 72 | — | — | CM13 | 20 | Synthetic wax 1 | 8 |
| CT21 | A1 | 72 | — | — | CM14 | 20 | Synthetic wax 1 | 8 |

TABLE 3-2

| Toner No. | Resin amount in second kneading step (mass %) | Pigment ratio (mass %) | Calcium carbonate ratio (mass %) | Amount of pigment/ polyester resin | CPES content (mass %) | T2 (ms) | X | DA/DB | Crystallite size (μm) | Peak intensity ratio |
|---|---|---|---|---|---|---|---|---|---|---|
| CT1 | 78.0 | 6.0 | 8.0 | 7.7 | 0.0% | 0.10 | 5.2 | 2.3 | 30 | 0.20 |
| CT2 | 78.0 | 6.0 | 8.0 | 7.7 | 4.0% | 0.10 | 5.2 | 2.3 | 30 | 0.20 |
| CT3 | 78.0 | 6.0 | 8.0 | 7.7 | 1.2% | 0.10 | 5.2 | 2.3 | 30 | 0.20 |
| CT4 | 78.0 | 6.0 | 8.0 | 7.7 | 9.5% | 0.10 | 5.2 | 2.3 | 30 | 0.20 |
| CT5 | 78.0 | 6.0 | 8.0 | 7.7 | 10.5% | 0.10 | 5.2 | 2.3 | 30 | 0.20 |
| CT6 | 78.0 | 6.0 | 8.0 | 7.7 | 0.0% | 0.10 | 5.2 | 2.3 | 30 | 0.20 |
| CT7 | 78.0 | 6.0 | 8.0 | 7.7 | 0.0% | 0.10 | 5.2 | 2.3 | 30 | 0.20 |
| CT8 | 78.0 | 6.0 | 8.0 | 7.7 | 0.0% | 0.10 | 5.2 | 2.3 | 30 | 0.20 |
| CT9 | 72.5 | 6.0 | 13.5 | 8.3 | 0.0% | 0.10 | 5.1 | 2.3 | 40 | 0.17 |
| CT10 | 82.0 | 6.0 | 4.0 | 7.3 | 0.0% | 0.11 | 5.2 | 2.3 | 25 | 0.22 |
| CT11 | 69.8 | 6.0 | 16.2 | 8.6 | 0.0% | 0.10 | 5.2 | 2.3 | 20 | 0.24 |
| CT12 | 83.2 | 6.0 | 2.8 | 7.2 | 0.0% | 0.10 | 4.9 | 2.3 | 50 | 0.14 |
| CT13 | 86.0 | 6.0 | 0.0 | 7.0 | 0.0% | 0.10 | 4.0 | 2.2 | — | — |
| CT14 | 78.0 | 6.0 | 8.0 | 7.7 | 0.0% | 0.10 | 3.0 | 2.2 | 30 | 0.20 |
| CT15 | 78.0 | 6.0 | 8.0 | 7.7 | 0.0% | 0.10 | 4.7 | 2.2 | 30 | 0.20 |
| CT16 | 78.0 | 6.0 | 8.0 | 7.7 | 0.0% | 0.12 | 2.7 | 2.1 | 30 | 0.20 |
| CT17 | 78.0 | 6.0 | 8.0 | 7.7 | 0.0% | 0.09 | 25.8 | 2.3 | 30 | 0.20 |
| CT18 | 78.0 | 6.0 | 8.0 | 7.7 | 0.0% | 0.08 | 60.0 | 2.3 | 30 | 0.20 |
| CT19 | 78.0 | 6.0 | 8.0 | 7.7 | 0.0% | 0.12 | 3.2 | 2.3 | 30 | 0.20 |
| CT20 | 78.0 | 6.0 | 8.0 | 7.7 | 0.0% | 0.07 | 5.7 | 2.3 | 30 | 0.20 |
| CT21 | 78.0 | 6.0 | 8.0 | 7.7 | 0.0% | 0.14 | 3.1 | 2.3 | 30 | 0.20 |

The calcium carbonate proportion in Tables 3-1, 3-2, 5-1, 5-2, 7-1 and 7-2 denotes the content ratio of calcium carbonate particles in the toner particle. Further, the “Amount of pigment/polyester resin” denotes the parts by mass of pigment relative to 100 parts by mass as the total amount of polyester resins A and B. Further, CPES content denotes the content ratio of crystalline polyester resin in the toner particle. Herein T2 is the transverse relaxation time T2 (ms) of a peak observed between 1.5 ppm and 2.5 ppm in solid-state NMR measurement. Further, X is the content (parts by mass) of resin with respect to 100 parts by mass of organic pigment in the solid fraction obtained in Procedure 1. The crystallite size is the crystallite size of calcium carbonate calculated from a peak at the diffraction angle (2θ)=29.5°±0.1° in an X-ray diffraction measurement of the toner. The peak intensity ratio is the value of a ratio of peak intensity at diffraction angle (2θ)=26.5°±0.1° relative to peak intensity at diffraction angle (2θ)=29.5°±0.1°, in an X-ray diffraction measurement of the toner.

Production of Magenta Pigment Masterbatch MM1

Magenta pigment (PR122): 30 parts

Calcium carbonate 1 (number-average particle diameter 400 nm): 40 parts

Polyester resin A1: 15 parts

Polyester resin B1: 15 parts

The above materials were mixed using a Henschel mixer (FM-75 model, by Nippon Coke & Engineering Co., Ltd.) at revolutions of 20 $s^{-1}$ and for a rotation time of 5 min, followed by kneading in a twin-screw kneader (PCM-30 model, by Ikegai Corporation) at 200 rpm and 120° C. The obtained kneaded product was cooled and coarsely pulverized in a pin mill down to a volume-average particle diameter of 100 μm or less, to yield a coarsely pulverized product of Magenta pigment masterbatch Mi.

Production of Magenta Pigment Masterbatches MM2 to MM9

Magenta pigment masterbatches MM2 to MM9 were obtained in the same way as in Magenta pigment masterbatch MM1, but modifying materials to those given in Table 4.

TABLE 4

| Masterbatch No. | Polyester resin A | Blending amount (parts) | Polyester resin B | Blending amount (parts) | Total amount of resin (parts) | Calcium carbonate | Blending amount (parts) | Pigment | Blending amount (parts) | Amount of pigment/ polyester resin |
|---|---|---|---|---|---|---|---|---|---|---|
| MM1 | A1 | 15 | B1 | 15 | 30 | Calcium carbonate 1 | 40 | PR122 | 30 | 100 |
| MM2 | A1 | 18 | B1 | 18 | 35 | Calcium carbonate 1 | 45 | PR122 | 20 | 57 |
| MM3 | A1 | 25 | B1 | 25 | 50 | Calcium carbonate 1 | 20 | PR122 | 30 | 60 |
| MM4 | A1 | 13 | B1 | 13 | 26 | Calcium carbonate 1 | 54 | PR122 | 20 | 77 |

TABLE 4-continued

| Masterbatch No. | Polyester resin A | Blending amount (parts) | Polyester resin B | Blending amount (parts) | Total amount of resin (parts) | Calcium carbonate | Blending amount (parts) | Pigment | Blending amount (parts) | Amount of pigment/ polyester resin |
|---|---|---|---|---|---|---|---|---|---|---|
| MM5 | A1 | 28 | B1 | 28 | 56 | Calcium carbonate 1 | 14 | PR122 | 30 | 54 |
| MM6 | A1 | 15 | B1 | 35 | 50 | — | 0 | PR122 | 50 | 100 |
| MM7 | A2 | 15 | B2 | 15 | 30 | Calcium carbonate 1 | 40 | PR122 | 30 | 100 |
| MM8 | A3 | 15 | B2 | 15 | 30 | Calcium carbonate 1 | 40 | PR122 | 30 | 100 |
| MM9 | A3 | 15 | B3 | 15 | 30 | Calcium carbonate 1 | 40 | PR122 | 30 | 100 |
| MM10 | A1 | 15 | B1 | 15 | 30 | Calcium carbonate 1 | 40 | PR122 | 30 | 100 |
| MM11 | A1 | 15 | B1 | 15 | 30 | Calcium carbonate 1 | 40 | PR122 | 30 | 100 |
| MM12 | A1 | 15 | B4 | 15 | 30 | Calcium carbonate 1 | 40 | PR122 | 30 | 100 |
| MM13 | A1 | 15 | B5 | 15 | 30 | Calcium carbonate 1 | 40 | PR122 | 30 | 100 |
| MM14 | A1 | 15 | B6 | 15 | 30 | Calcium carbonate 1 | 40 | PR122 | 30 | 100 |

In the table, the "Amount of pigment/polyester resin" denotes parts by mass of pigment relative to 100 parts by mass of polyester resin. The first kneading step was performed once in MM1 to MM9 and MM12 to MM14. The first kneading step was performed twice in MM10. The first kneading step was performed thrice in MM11.

Production of Magenta Pigment Masterbatch MN/0

A powder was produced in the same way as in Magenta pigment masterbatch MM1, but modifying the materials to those given in Table 4, and the obtained powder was further kneaded in a twin-screw kneader (PCM-30 model, by Ikegai Corporation) at 200 rpm and 120° C. The obtained kneaded product was cooled and coarsely pulverized in a pin mill down to a volume-average particle diameter of 100 μm or less, to yield a coarsely pulverized product of Magenta pigment masterbatch MM10.

Production of Magenta Pigment Masterbatch MM11

A powder was produced in the same way as in Magenta pigment masterbatch MM8, but modifying the materials to those given in Table 4, and the obtained powder was further kneaded in a twin-screw kneader (PCM-30 model, by Ikegai Corporation) at 200 rpm and 120° C. The obtained kneaded product was cooled and coarsely pulverized in a pin mill down to a volume-average particle diameter of 100 μm or less, to yield a coarsely pulverized product of Magenta pigment masterbatch MM11.

Production of Magenta Pigment Masterbatches MM12 to MM14

Magenta Pigment Masterbatches MM12 to MM14 were Obtained in the Same way as in Magenta pigment masterbatch MM1, but modifying materials to those given in Table 4.

Production of Magenta Toner MT1

Polyester resin A1: 72 parts

Pigment masterbatch MM1: 20 parts

Synthetic wax 1: 8 parts (hydrocarbon wax, peak temperature of maximum endothermic peak: 90° C.)

The above materials were mixed using a Henschel mixer (FM-75 model, by Nippon Coke & Engineering Co., Ltd.) at revolutions of 20 $s^{-1}$ and for a rotation time of 5 min, followed by kneading at a set temperature of 130° C. in a twin-screw kneader (PCM-30 model, by Ikegai Corporation). The obtained kneaded product was cooled and coarsely pulverized in a pin mill down to a volume-average particle diameter of 100 m or less, to yield a coarsely pulverized product. The obtained coarsely pulverized product was finely pulverized using a mechanical pulverizer (T-250, by Turbo Kogyo Co., Ltd.), with the revolutions and number of passes adjusted so as to obtain the target particle diameter. The resulting product was classified using a rotary classifier (200TSP, by Hosokawa Micron Corporation), to yield a toner particle.

The operating conditions of the rotary classifier (200TSP, by Hosokawa Micron Corporation) involved classification by adjusting the revolutions so that the targeted particle diameter and particle size distribution were obtained. Then 1.8 parts of fine silica particles having a specific surface area of 200 $m^2/g$, as measured in accordance with the BET method and having been hydrophobized with silicone oil, were added to 100 parts of the obtained toner particle, and the whole was mixed using a Henschel mixer (FM-75 model, by Nippon Coke & Engineering Co., Ltd.), at revolutions of 30 $s^{-1}$ and for a rotation time of 10 min, to yield Magenta toner MT1.

Production Example of Magenta Toner MT2 to MT14

Magenta toner MT2 to MT14 were obtained in the same way as in Magenta toner MT1, but modifying materials to those given in Table 5-1. Table 5-2 shows the physical characteristics of the Magenta toner.

TABLE 5-1

| Toner No. | Polyester resin Lot | Polyester resin Blending amount (parts) | Magenta masterbatch Lot | Magenta masterbatch Blending amount (parts) | Wax Lot | Wax Blending amount (parts) |
|---|---|---|---|---|---|---|
| MT1 | A1 | 72 | MM1 | 20 | Synthetic wax 1 | 8 |
| MT2 | A1 | 62 | MM2 | 30 | Synthetic wax 1 | 8 |
| MT3 | A1 | 72 | MM3 | 20 | Synthetic wax 1 | 8 |
| MT4 | A1 | 62 | MM4 | 30 | Synthetic wax 1 | 8 |
| MT5 | A1 | 72 | MM5 | 20 | Synthetic wax 1 | 8 |
| MT6 | A1 | 80 | MM6 | 12 | Synthetic wax 1 | 8 |

TABLE 5-1-continued

| | Polyester resin | | Magenta masterbatch | | Wax | |
|---|---|---|---|---|---|---|
| Toner No. | Lot | Blending amount (parts) | Lot | Blending amount (parts) | Lot | Blending amount (parts) |
| MT7 | A2 | 72 | MM7 | 20 | Synthetic wax 1 | 8 |
| MT8 | A3 | 72 | MM8 | 20 | Synthetic wax 1 | 8 |
| MT9 | A3 | 72 | MM9 | 20 | Synthetic wax 1 | 8 |
| MT10 | A1 | 72 | MM10 | 20 | Synthetic wax 1 | 8 |
| MT11 | A1 | 72 | MM11 | 20 | Synthetic wax 1 | 8 |
| MT12 | A1 | 72 | MM12 | 20 | Synthetic wax 1 | 8 |
| MT13 | A1 | 72 | MM13 | 20 | Synthetic wax 1 | 8 |
| MT14 | A1 | 72 | MM14 | 20 | Synthetic wax 1 | 8 |

TABLE 5-2

| Toner No. | Resin amount in second kneading step (mass %) | Pigment ratio (mass %) | Calcium carbonate ratio (mass %) | Amount of pigment/polyester resin | T2 (ms) | X | DA/DB | Crystallite size (μm) | Peak intensity ratio |
|---|---|---|---|---|---|---|---|---|---|
| MT1 | 78.0 | 6.0 | 8.0 | 7.7 | 0.10 | 5.2 | 2.4 | 25 | 0.20 |
| MT2 | 72.5 | 6.0 | 13.5 | 8.3 | 0.10 | 5.0 | 2.3 | 35 | 0.17 |
| MT3 | 82.0 | 6.0 | 4.0 | 7.3 | 0.11 | 5.2 | 2.3 | 25 | 0.22 |
| MT4 | 69.8 | 6.0 | 16.2 | 8.6 | 0.10 | 4.9 | 2.3 | 20 | 0.24 |
| MT5 | 83.2 | 6.0 | 2.8 | 7.2 | 0.10 | 4.9 | 2.3 | 45 | 0.14 |
| MT6 | 86.0 | 6.0 | 0.0 | 7.0 | 0.10 | 4.0 | 2.2 | — | — |
| MT7 | 78.0 | 6.0 | 8.0 | 7.7 | 0.10 | 3.0 | 2.2 | 25 | 0.20 |
| MT8 | 78.0 | 6.0 | 8.0 | 7.7 | 0.10 | 4.7 | 2.2 | 35 | 0.20 |
| MT9 | 78.0 | 6.0 | 8.0 | 7.7 | 0.12 | 2.7 | 2.0 | 30 | 0.20 |
| MT10 | 78.0 | 6.0 | 8.0 | 7.7 | 0.09 | 26.4 | 2.3 | 30 | 0.20 |
| MT11 | 78.0 | 6.0 | 8.0 | 7.7 | 0.08 | 62.1 | 2.3 | 25 | 0.20 |
| MT12 | 78.0 | 6.0 | 8.0 | 7.7 | 0.12 | 3.2 | 2.3 | 30 | 0.20 |
| MT13 | 78.0 | 6.0 | 8.0 | 7.7 | 0.07 | 5.8 | 2.3 | 30 | 0.20 |
| MT14 | 78.0 | 6.0 | 8.0 | 7.7 | 0.14 | 3.1 | 2.3 | 30 | 0.20 |

The abbreviations in the table are as given in Tables 3-1 and 3-2. Herein X is the content (parts by mass) of resin with respect to 100 parts by mass of organic pigment in the solid fraction obtained in Procedure 1.

Production of Yellow Pigment Masterbatch YM1

Yellow pigment (PY180): 30 parts

Calcium carbonate 1 (number-average particle diameter 400 nm): 40 parts

Polyester resin A1: 15 parts

Polyester resin B1: 15 parts

The above materials were mixed using a Henschel mixer (FM-75 model, by Nippon Coke & Engineering Co., Ltd.) at revolutions of 20 $s^{-1}$ and for a rotation time of 5 min, followed by kneading in a twin-screw kneader (PCM-30 model, by Ikegai Corporation) at 200 rpm and 120° C. The obtained kneaded product was cooled and coarsely pulverized in a pin mill down to a volume-average particle diameter of 100 μm or less, to yield a coarsely pulverized product of Yellow pigment masterbatch YM1.

Production of Yellow Pigment Masterbatches YM2 to YM9

Yellow pigment masterbatches YM2 to YM9 were obtained in the same way as in Yellow pigment masterbatch YM1, but modifying materials to those given in Table 6.

TABLE 6

| Masterbatch No. | Polyester resin A | Blending amount (parts) | Polyester resin B | Blending amount (parts) | Total amount of resin (parts) | Calcium carbonate | Blending amount (parts) | Pigment | Blending amount (parts) | Amount of pigment/polyester resin |
|---|---|---|---|---|---|---|---|---|---|---|
| YM1 | A1 | 15 | B1 | 15 | 30 | Calcium carbonate 1 | 40 | PY180 | 30 | 100 |
| YM2 | A1 | 18 | B1 | 18 | 35 | Calcium carbonate 1 | 45 | PY180 | 20 | 57 |
| YM3 | A1 | 25 | B1 | 25 | 50 | Calcium carbonate 1 | 20 | PY180 | 30 | 60 |
| YM4 | A1 | 13 | B1 | 13 | 26 | Calcium carbonate 1 | 54 | PY180 | 20 | 77 |
| YM5 | A1 | 28 | B1 | 28 | 56 | Calcium carbonate 1 | 14 | PY180 | 30 | 54 |
| YM6 | A1 | 15 | B1 | 35 | 50 | — | 0 | PY180 | 50 | 100 |
| YM7 | A2 | 15 | B2 | 15 | 30 | Calcium carbonate 1 | 40 | PY180 | 30 | 100 |
| YM8 | A3 | 15 | B2 | 15 | 30 | Calcium carbonate 1 | 40 | PY180 | 30 | 100 |
| YM9 | A3 | 15 | B3 | 15 | 30 | Calcium carbonate 1 | 40 | PY180 | 30 | 100 |
| YM10 | A1 | 15 | B1 | 15 | 30 | Calcium carbonate 1 | 40 | PY180 | 30 | 100 |
| YM11 | A1 | 15 | B1 | 15 | 30 | Calcium carbonate 1 | 40 | PY180 | 30 | 100 |
| YM12 | A1 | 15 | B4 | 15 | 30 | Calcium carbonate 1 | 40 | PY180 | 30 | 100 |
| YM13 | A1 | 15 | B5 | 15 | 30 | Calcium carbonate 1 | 40 | PY180 | 30 | 100 |
| YM14 | A1 | 15 | B6 | 15 | 30 | Calcium carbonate 1 | 40 | PY180 | 30 | 100 |

In the table, the "Amount of pigment/polyester resin" denotes parts by mass of pigment relative to 100 parts by mass of polyester resin. The first kneading step was performed once in YM1 to YM9 and YM12 to YM14. The first kneading step was performed twice in YM10. The first kneading step was performed thrice in YM11.

Production of Yellow Pigment Masterbatch YM10

A powder was produced in the same way as in Yellow pigment masterbatch YM1, but modifying the materials to those given in Table 6, and the obtained powder was further kneaded in a twin-screw kneader (PCM-30 model, by Ikegai Corporation) at 200 rpm and 120° C. The obtained kneaded product was cooled and coarsely pulverized in a pin mill down to a volume-average particle diameter of 100 μm or less, to yield a coarsely pulverized product of Yellow pigment masterbatch YM10.

Production of Yellow Pigment Masterbatch YM11

A powder was produced in the same way as in Yellow pigment masterbatch YM8, but modifying the materials to those given in Table 6, and the obtained powder was further kneaded in a twin-screw kneader (PCM-30 model, by Ikegai Corporation) at 200 rpm and 120° C. The obtained kneaded product was cooled and coarsely pulverized in a pin mill down to a volume-average particle diameter of 100 μm or less, to yield a coarsely pulverized product of Yellow pigment masterbatch YM11.

Production of Yellow Pigment Masterbatches YM12 to YM14

Yellow pigment masterbatches YM12 to YM14 were obtained in the same way as in Yellow pigment masterbatch YM1, but modifying materials to those given in Table 6.

Production of Yellow Toner YT1

Polyester resin A1: 72 parts

Pigment masterbatch YM1: 20 parts

Synthetic wax 1: 8 parts (hydrocarbon wax, peak temperature of maximum endothermic peak: 90° C.)

The above materials were mixed using a Henschel mixer (FM-75 model, by Nippon Coke & Engineering Co., Ltd.) at revolutions of 20 $s^{-1}$ and for a rotation time of 5 min, followed by kneading at a set temperature of 130° C. in a twin-screw kneader (PCM-30 model, by Ikegai Corporation). The obtained kneaded product was cooled and coarsely pulverized in a pin mill down to a volume-average particle diameter of 100 m or less, to yield a coarsely pulverized product. The obtained coarsely pulverized product was finely pulverized using a mechanical pulverizer (T-250, by Turbo Kogyo Co., Ltd.), with the revolutions and number of passes adjusted so as to obtain the target particle diameter. The resulting product was classified using a rotary classifier (200TSP, by Hosokawa Micron Corporation), to yield a toner particle.

The operating conditions of the rotary classifier (200TSP, by Hosokawa Micron Corporation) involved classification by adjusting the revolutions so that the targeted particle diameter and particle size distribution were obtained. Then 1.8 parts of fine silica particles having a specific surface area of 200 $m^2/g$, as measured in accordance with the BET method and having been hydrophobized with silicone oil, were added to 100 parts of the obtained toner particle, and the whole was mixed using a Henschel mixer (FM-75 model, by Nippon Coke & Engineering Co., Ltd.), at revolutions of 30 $s^{-1}$ and for a rotation time of 10 min, to yield Yellow toner YT1.

Production Example of Yellow Toner YT2 to YT14

Yellow toner YT2 to YT14 were obtained in the same way as in Yellow toner YT1, but modifying materials to those given in Table 7-1. Table 7-2 shows the physical characteristics of the Yellow toner.

TABLE 7-1

| | Polyester resin | | Yellow masterbatch | | Wax | |
|---|---|---|---|---|---|---|
| Toner No. | Lot | Blending amount (parts) | Lot | Blending amount (parts) | Lot | Blending amount (parts) |
| YT1 | A1 | 72 | YM1 | 20 | Synthetic wax 1 | 8 |
| YT2 | A1 | 62 | YM2 | 30 | Synthetic wax 1 | 8 |
| YT3 | A1 | 72 | YM3 | 20 | Synthetic wax 1 | 8 |
| YT4 | A1 | 62 | YM4 | 30 | Synthetic wax 1 | 8 |
| YT5 | A1 | 72 | YM5 | 20 | Synthetic wax 1 | 8 |
| YT6 | A1 | 80 | YM6 | 12 | Synthetic wax 1 | 8 |
| YT7 | A2 | 72 | YM7 | 20 | Synthetic wax 1 | 8 |
| YT8 | A3 | 72 | YM8 | 20 | Synthetic wax 1 | 8 |
| YT9 | A3 | 72 | YM9 | 20 | Synthetic wax 1 | 8 |
| YT10 | A1 | 72 | YM10 | 20 | Synthetic wax 1 | 8 |
| YT11 | A1 | 72 | YM11 | 20 | Synthetic wax 1 | 8 |
| YT12 | A1 | 72 | YM12 | 20 | Synthetic wax 1 | 8 |
| YT13 | A1 | 72 | YM13 | 20 | Synthetic wax 1 | 8 |
| YT14 | A1 | 72 | YM14 | 20 | Synthetic wax 1 | 8 |

TABLE 7-2

| Toner No. | Resin amount in second kneading step (mass %) | Pigment ratio (mass %) | Calcium carbonate ratio (mass %) | Amount of pigment/ polyester resin | T2 (ms) | X | DA/DB | Crystallite size (μm) | Peak intensity ratio |
|---|---|---|---|---|---|---|---|---|---|
| YT1 | 78.0 | 6.0 | 8.0 | 7.7 | 0.10 | 5.2 | 2.3 | 30 | 0.20 |
| YT2 | 72.5 | 6.0 | 13.5 | 8.3 | 0.10 | 5.2 | 2.3 | 40 | 0.17 |

TABLE 7-2-continued

| Toner No. | Resin amount in second kneading step (mass %) | Pigment ratio (mass %) | Calcium carbonate ratio (mass %) | Amount of pigment/ polyester resin | T2 (ms) | X | DA/DB | Crystallite size (μm) | Peak intensity ratio |
|---|---|---|---|---|---|---|---|---|---|
| YT3 | 82.0 | 6.0 | 4.0 | 7.3 | 0.11 | 4.8 | 2.3 | 25 | 0.22 |
| YT4 | 69.8 | 6.0 | 16.2 | 8.6 | 0.10 | 5.4 | 2.3 | 20 | 0.24 |
| YT5 | 83.2 | 6.0 | 2.8 | 7.2 | 0.10 | 4.7 | 2.3 | 50 | 0.14 |
| YT6 | 86.0 | 6.0 | 0.0 | 7.0 | 0.10 | 3.7 | 2.3 | — | — |
| YT7 | 78.0 | 6.0 | 8.0 | 7.7 | 0.10 | 3.0 | 2.2 | 25 | 0.20 |
| YT8 | 78.0 | 6.0 | 8.0 | 7.7 | 0.10 | 4.7 | 2.2 | 30 | 0.20 |
| YT9 | 78.0 | 6.0 | 8.0 | 7.7 | 0.12 | 2.6 | 2.0 | 25 | 0.20 |
| YT10 | 78.0 | 6.0 | 8.0 | 7.7 | 0.09 | 28.5 | 2.3 | 30 | 0.20 |
| YT11 | 78.0 | 6.0 | 8.0 | 7.7 | 0.08 | 61.2 | 2.3 | 25 | 0.20 |
| YT12 | 78.0 | 6.0 | 8.0 | 7.7 | 0.12 | 3.2 | 2.3 | 30 | 0.20 |
| YT13 | 78.0 | 6.0 | 8.0 | 7.7 | 0.07 | 5.9 | 2.3 | 30 | 0.20 |
| YT14 | 78.0 | 6.0 | 8.0 | 7.7 | 0.14 | 3.2 | 2.3 | 30 | 0.20 |

The abbreviations in the table are as given in Tables 3-1 and 3-2. Herein X is the content (parts by mass) of resin with respect to 100 parts by mass of organic pigment in the solid fraction obtained in Procedure 1.

Production Example of Magnetic Carrier 1

Magnetite 1 having a number-average particle diameter of 0.30 μm (intensity of magnetization of 65 $Am^2/kg$ in a magnetic field of 1000/4π (kA/m))

Magnetite 2 having a number-average particle diameter of 0.50 μm (intensity of magnetization of 65 $Am^2/kg$ in a magnetic field of 1000/4π (kA/m))

Herein 4.0 parts of a silane compound (3-(2-aminoethylaminopropyl)trimethoxysilane) were added relative to 100 parts of each of the above materials, with high-speed mixing and stirring at 100° C. or above, inside a vessel, to treat the respective fine particles.

Phenol: 10 mass %

Formaldehyde solution: 6 mass % (40 mass % formaldehyde, 10 mass % methanol, 50 mass % water)

Magnetite 1 treated with the above silane compound: 58 mass %

Magnetite 2 treated with the above silane compound: 26 mass %

Then 100 parts of the above materials, 5 parts of a 28 mass % aqueous ammonia solution, and 20 parts of water were charged into a flask, the temperature was raised to 85° C. over 30 minutes while under mixing by stirring, and a polymerization reaction was conducted by holding that temperature for 3 hours, to cure the generated phenolic resin. The cured phenolic resin was then cooled down to 30° C., followed by further addition of water, after which the supernatant was removed, and the precipitate was washed with water and was subsequently air-dried. The resulting product was next dried under reduced pressure (5 mmHg or lower) at a temperature of 60° C., to yield a spherical Magnetic carrier 1 of magnetic body-dispersed type. The volume-basis 50% particle diameter (D50) of Magnetic carrier 1 was 34.2 μm.

Production Example of Cyan Two-Component Developer CD1

Herein 8.0 parts of Cyan toner CT1 were added to 92.0 parts of Magnetic carrier 1, and the whole was mixed using a V-type mixer (V-20, by Seishin Enterprise Co., Ltd.), to yield Cyan two-component developer CD1.

Cyan Two-Component Developer CD2 to CD21

Cyan Two-Component Developer CD2 to CD21 were obtained in the same way as in Cyan Two-Component Developer CD1, but modifying materials to those given in Table 8.

Production Example of Magenta Two-Component Developer MD1

Herein 8.0 parts of Magenta toner MT1 were added to 92.0 parts of Magnetic carrier 1, and the whole was mixed using a V-type mixer (V-20, by Seishin Enterprise Co., Ltd.), to yield Magenta two-component developer MD1.

Magenta Two-Component Developer MD2 to MD21

Magenta Two-Component Developer MD2 to MD21 were obtained in the same way as in Magenta Two-Component Developer MD1, but modifying materials to those given in Table 9.

Production Example of Yellow Two-Component Developer YD1

Herein 8.0 parts of Yellow toner YT1 were added to 92.0 parts of Magnetic carrier 1, and the whole was mixed using a V-type mixer (V-20, by Seishin Enterprise Co., Ltd.), to yield Yellow two-component developer YD1.

Yellow Two-Component Developer YD2 to MD14

Yellow Two-Component Developer YD2 to MD14 were obtained in the same way as in Yellow Two-Component Developer YD1, but modifying materials to those given in Table 10.

Methods for evaluating images obtained using the above toners will be described below.

Method for Evaluating Image Density (Toner Tinting Strength)

A modified full-color copier by Canon Inc. (product name: image RUNNER ADVANCE C5255) was used as an electrophotographic image forming apparatus. Depending on the toner to be evaluated, a respective two-component developer to be evaluated was placed in each developing device of cyan, magenta or yellow, and the evaluation was performed.

The evaluation environment was set to a normal-temperature, normal-humidity environment (23° C./50% RH), and an unfixed toner image (toner laid-on level 0.45 $mg/cm^2$) was formed using plain copy paper (product name: GFC-081, A4 paper, basis weight: 81.4 $g/m^2$, sold by Canon Marketing Japan Inc.) as evaluation paper. The unfixed image was fixed using a fixing unit removed from a commercially available full-color digital copier (image RUN- NER ADVANCE C5255, by Canon Inc.). The image density of the obtained fixed image was then measured using an X-Rite color reflection densitometer (500 series: by X-Rite, Inc.). Image density was evaluated herein according to the following criteria.

Evaluation Criteria for Cyan Toner

A: 1.80 or higher
B: 1.70 to less than 1.80
C: 1.60 to less than 1.70
D: lower than 1.60

Evaluation Criteria for Magenta Toner

A: 1.60 or higher
B: 1.50 to less than 1.60
C: 1.40 to less than 1.50
D: lower than 1.40

Evaluation Criteria for Yellow Toner

A: 1.80 or higher
B: 1.70 to less than 1.80
C: 1.60 to less than 1.70
D: lower than 1.60

The evaluation results are given in Tables 8 to 10.

Method for Evaluating Density Stability

A modified full-color copier by Canon Inc. (product name: image RUNNER ADVANCE C5255) was used as an electrophotographic image forming apparatus. Depending on the toner to be evaluated, a respective two-component developer to be evaluated was placed in each developing device of cyan, magenta or yellow, and the evaluation was performed. The evaluation environment was set to 20° C./8% RH. The evaluation paper used was plain copy paper (product name: GFC-081, A4 paper, basis weight: 81.4 g/m$^2$, sold by Canon Marketing Japan Inc.).

Herein a 16-gradation image (initial image) was formed by modifying the laid-on level of toner on the paper. The values of L*, a* and b* of the obtained image were measured using Spectro Scan Transmission (by GretagMacbeth LLC) (measurement conditions: D50 view angle 2°). In the measurement, L1*, a1* and b1* were measured for a toner laid-on level at which C*=85 held in the L*-c* coordinate axis.

The toner laid-on level for which the image density of a FFH image (solid portion) was 1.45 was then worked out, and developing bias was adjusted. After adjustment of the developing bias there were outputted 50000 (50k) prints of an image having a printing ratio of 1%, with replenishment of given amounts of toner so that the density of toner was constant.

Once outputting of the 50000 image prints was over, a 16-gradation image was formed by modifying the laid-on level of toner on the paper. Then the values of L*, a* and b* of the obtained image were measured using Spectro Scan Transmission (by GretagMacbeth LLC) (measurement conditions: D50 view angle 2°). In the measurement, L2*, a2* and b2* were measured for a toner laid-on level at which C*=85 held in the L*-c* coordinate axis, and ΔE was calculated on the basis of the values of L*, a* and b* of the initial image and of the image after output of 20000 image prints. The evaluation results are given in Tables 8 to 10.

$$\Delta E=\{(L1^*-L2^*)^2+(a1^*-a2^*)^2+(b1^*-b2^*)^2\}^{1/2}$$

A: ΔE smaller than 2.0
B: ΔE from 2.0 to less than 3.5
C: ΔE from 3.5 to less than 5.0
D: ΔE of 5.0 or larger

TABLE 8

| | Developer No. | Toner No. | Magnetic carrier No. | Image density | | Density stability | |
|---|---|---|---|---|---|---|---|
| Example 1 | CD1 | CT1 | 1 | 1.82 | A | 1.7 | A |
| Example 2 | CD2 | CT2 | 1 | 1.85 | A | 1.5 | A |
| Example 3 | CD3 | CT3 | 1 | 1.84 | A | 1.7 | A |
| Example 4 | CD4 | CT4 | 1 | 1.83 | A | 1.7 | A |
| Example 5 | CD5 | CT5 | 1 | 1.78 | B | 1.7 | A |
| Example 6 | CD6 | CT6 | 1 | 1.82 | A | 1.6 | A |
| Example 7 | CD7 | CT7 | 1 | 1.82 | A | 1.6 | A |
| Example 8 | CD8 | CT8 | 1 | 1.82 | A | 2.1 | B |
| Example 9 | CD9 | CT9 | 1 | 1.81 | A | 1.8 | A |
| Example 10 | CD10 | CT10 | 1 | 1.80 | A | 1.8 | A |
| Example 11 | CD11 | CT11 | 1 | 1.78 | B | 1.9 | A |
| Example 12 | CD12 | CT12 | 1 | 1.76 | B | 2.3 | B |
| Example 13 | CD13 | CT13 | 1 | 1.76 | B | 2.6 | B |
| Example 14 | CD14 | CT14 | 1 | 1.75 | B | 2.8 | B |
| Example 15 | CD15 | CT15 | 1 | 1.74 | B | 2.6 | B |
| Example 16 | CD16 | CT16 | 1 | 1.72 | B | 3.6 | C |
| Example 17 | CD17 | CT17 | 1 | 1.68 | C | 3.9 | C |
| Example 18 | CD18 | CT18 | 1 | 1.65 | C | 4.0 | C |
| Example 19 | CD19 | CT19 | 1 | 1.63 | C | 4.2 | C |
| Comparative example 1 | CD20 | CT20 | 1 | 1.59 | D | 4.2 | C |
| Comparative example 2 | CD21 | CT21 | 1 | 1.63 | C | 5.3 | D |

TABLE 9

| | Developer No. | Toner No. | Magnetic carrier No. | Image density | | Density stability | |
|---|---|---|---|---|---|---|---|
| Example 20 | MD1 | MT1 | 1 | 1.63 | A | 1.6 | A |
| Example 21 | MD2 | MT2 | 1 | 1.62 | A | 1.7 | A |
| Example 22 | MD3 | MT3 | 1 | 1.61 | A | 1.7 | A |
| Example 23 | MD4 | MT4 | 1 | 1.59 | B | 1.8 | A |
| Example 24 | MD5 | MT5 | 1 | 1.58 | B | 2.4 | B |
| Example 25 | MD6 | MT6 | 1 | 1.57 | B | 2.5 | B |
| Example 26 | MD7 | MT7 | 1 | 1.57 | B | 2.6 | B |
| Example 27 | MD8 | MT8 | 1 | 1.56 | B | 2.5 | B |
| Example 28 | MD9 | MT9 | 1 | 1.54 | B | 3.4 | C |
| Example 29 | MD10 | MT10 | 1 | 1.49 | C | 3.8 | C |
| Example 30 | MD11 | MT11 | 1 | 1.48 | C | 4.1 | C |
| Example 31 | MD12 | MT12 | 1 | 1.46 | C | 4.2 | C |
| Comparative example 3 | MD13 | MT13 | 1 | 1.39 | D | 4.2 | C |
| Comparative example 4 | MD14 | MT14 | 1 | 1.46 | C | 5.4 | D |

TABLE 10

| | Developer No. | Toner No. | Magnetic carrier No. | Image density | | Density stability | |
|---|---|---|---|---|---|---|---|
| Example 32 | YD1 | YT1 | 1 | 1.84 | A | 1.6 | A |
| Example 33 | YD2 | YT2 | 1 | 1.82 | A | 1.7 | A |
| Example 34 | YD3 | YT3 | 1 | 1.81 | A | 1.7 | A |
| Example 35 | YD4 | YT4 | 1 | 1.79 | B | 1.9 | A |
| Example 36 | YD5 | YT5 | 1 | 1.77 | B | 2.2 | B |
| Example 37 | YD6 | YT6 | 1 | 1.76 | B | 2.5 | B |
| Example 38 | YD7 | YT7 | 1 | 1.75 | B | 2.7 | B |
| Example 39 | YD8 | YT8 | 1 | 1.75 | B | 2.5 | B |
| Example 40 | YD9 | YT9 | 1 | 1.72 | B | 3.4 | C |
| Example 41 | YD10 | YT10 | 1 | 1.69 | C | 3.8 | C |
| Example 42 | YD11 | YT11 | 1 | 1.66 | C | 4.1 | C |

TABLE 10-continued

| | Developer No. | Toner No. | Magnetic carrier No. | Image density | | Density stability | |
|---|---|---|---|---|---|---|---|
| Example 43 | YD12 | YT12 | 1 | 1.63 | C | 4.2 | C |
| Comparative example 5 | YD13 | YT13 | 1 | 1.59 | D | 4.2 | C |
| Comparative example 6 | YD14 | YT14 | 1 | 1.63 | C | 5.4 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2021-184947, filed Nov. 12, 2021, which is hereby incorporated by reference herein in its entirety.

What is claimed is:

1. A toner, comprising:

a toner particle comprising an organic pigment, a binder resin and a calcium carbonate particle; and a content ratio of the calcium carbonate particle in the toner particle being 3.0 to 15.0 mass %;

peaks being present in ranges of diffraction angle (2θ)–26.5°±0.1° and diffraction angle (2θ)=29.5°±0.1° when an X-ray diffraction measurement is performed on the toner using CuKα rays;

a crystallite size of the calcium carbonate calculated from a peak in the range of diffraction angle (2θ)–29.5°=0.1° being 10 to 45 nm; and a value of a ratio of peak intensity in the range of diffraction angle (2θ)=26.5°±0.1° relative to peak intensity in the range of diffraction angle (2θ)–29.5°=0.1° is 0.15 to 0.24, wherein in a solid-state NMR measurement at 60° C. using a solid fraction obtained in Procedure 1 as a sample, a transverse relaxation time T2 of a peak observed between 1.5 and 2.5 ppm is 0.08 to 0.13 ms, and Procedure 1 comprises preparing a sucrose concentrate by adding 160 g sucrose to 100 mL ion-exchanged water, and dissolution therein while under warming in hot water, producing a dispersion by adding 31 g of the sucrose concentrate and 6 mL surfactant to a centrifuge tube, adding 2.0 g of the toner to the dispersion, breaking toner clumps using a spatula, shaking the centrifuge tube in a shaker followed by removing precipitate through solution centrifugation at 3500 rpm for 30 minutes at a rotation radius of 3 cm, filtering a floating solid fraction in a vacuum filter, and is thereafter dried in a dryer for at least 1 hour dissolving 1 g of the obtained solid fraction in 20 mL of chloroform, centrifuging at 15000 rpm at a rotation radius of 3 cm for 180 minutes, discarding the supernatant, adding 20 mL of chloroform, repeating the same operation twice, and drying a precipitated solid fraction in a dryer for at least 5 hours.

2. The toner according to claim 1, wherein a content of a resin is 3.0 to 50.0 parts by mass relative to 100 parts by mass of the organic pigment in the solid fraction obtained in Procedure 1.

3. The toner according to claim 1, wherein DA/DB is 2.2 or higher when DA is a number-average particle diameter of the organic pigment when the solid fraction obtained in Procedure 1 is observed by scanning electron microscope, and DB is a number-average particle diameter of the organic pigment when the solid fraction is stirred by a stirring apparatus and dispersed by an impact-type dispersing apparatus, and an obtained dispersion is observed by a dynamic light scattering type particle size distribution meter.

4. The toner according to claim 1, wherein the binder resin comprises a polyester resin A and a polyester resin B, resin A has a weight-average molecular weight of 3000 to 50000, resin B has a weight-average molecular weight of 500000 to 2300000, and the organic pigment is bound to resin B.

5. The toner according to claim 4, wherein resin A and resin B have a same monomer unit.

6. The toner according to claim 4, wherein resin A and resin B are condensation polymers of monomers comprising an alkylene oxide adduct of bisphenol A, terephthalic acid and trimellitic acid or an anhydride thereof.

7. The toner according to claim 4, wherein resin A and resin B are amorphous polyester resins, the toner particle comprises a crystalline polyester resin, and a content ratio of the crystalline polyester resin in the toner particle is 1.0 to 10.0 mass %.

8. The toner according to claim 1, wherein the toner comprises the toner particle and a strontium titanate particle as an external additive, and a content of the strontium titanate particle in the toner is 0.1 to 1.0 part by mass relative to 100 parts by mass of the toner particle.

9. A method for producing the toner according to claim 1, in which the binder resin comprises a polyester resin A and a polyester resin B, a weight-average molecular weight of resin A being 3000 to 50000 and a weight-average molecular weight of resin B from being 500000 to 2300000, the production method comprising:

a first kneading step of obtaining a pigment mixture by melt-kneading the organic pigment and part of the binder resin, a content ratio of a total of resin A and resin B in the pigment mixture being 20 to 50 mass % and a content ratio of the organic pigment in the pigment mixture being 20 to 60 mass %, and a second kneading step of obtaining a resin composition by melt-kneading of the pigment mixture and a remainder of the binder resin, a content ratio of a total of resin A and resin B in the resin composition being 50 to 80 mass % and a content ratio of the organic pigment in the resin composition being 3 to 20 mass %.

10. The method for producing toner according to claim 9, wherein a content ratio of the polyester resin B in the pigment mixture is 5 to 30 mass %.

* * * * *